US007867474B2

(12) United States Patent
Lewis et al.

(10) Patent No.: US 7,867,474 B2
(45) Date of Patent: Jan. 11, 2011

(54) CRYSTALLINE ALUMINOSILICATES: UZM-13, UZM-17, UZM-19 AND UZM-25

(75) Inventors: Gregory J. Lewis, Santa Cruz, CA (US); Lisa M. Knight, Chicago, IL (US); Mark A. Miller, Niles, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 513 days.

(21) Appl. No.: 12/036,893

(22) Filed: Feb. 25, 2008

(65) Prior Publication Data

US 2008/0170987 A1    Jul. 17, 2008

Related U.S. Application Data

(63) Continuation-in-part of application No. 10/945,293, filed on Sep. 20, 2004, now abandoned.

(51) Int. Cl.
   *C01B 39/48*    (2006.01)
(52) U.S. Cl. .................. 423/718; 423/705; 423/708; 423/329.1
(58) Field of Classification Search ............ 423/329.1, 423/704, 705, 708, 718
   See application file for complete search history.

(56) References Cited

U.S. PATENT DOCUMENTS

| 5,068,096 | A  | 11/1991 | Valyocsik | .................... 423/277 |
| 6,419,895 | B1 | 7/2002  | Lewis et al. | .................. 423/718 |
| 6,713,041 | B1 | 3/2004  | Moscoso et al. | ............ 423/705 |
| 6,756,030 | B1 | 6/2004  | Rohde et al. | ................. 423/718 |
| 7,008,611 | B2 | 3/2006  | Canos et al. | ................. 423/718 |

FOREIGN PATENT DOCUMENTS

WO    WO 02/42208 A1    5/2002

OTHER PUBLICATIONS

*J. Chem Soc., Chem. Commun.*, (1995), 2187).
S.L. Lawton et. al., *J. Phys. Chem.*, (1996) 100, 3788-3798.).

*Primary Examiner*—David M Brunsman
(74) *Attorney, Agent, or Firm*—Frank S Molinaro

(57) ABSTRACT

A series of crystalline layered and microporous compositions have been prepared. Compositions that have a layered structure and are identified as UZM-13, UZM-17 and UZM-19. Upon calcination at a temperature of about 400° C. to about 600° C., these compositions form a microporous crystalline zeolite with a three dimensional framework which has been identified as UZM-25. A process for preparing all these compositions and processes for using these compositions are also disclosed.

17 Claims, No Drawings

CRYSTALLINE ALUMINOSILICATES: UZM-13, UZM-17, UZM-19 AND UZM-25

CROSS-REFERENCE TO RELATED APPLICATION

This application is a Continuation-In-Part of application Ser. No. 10/945,293 filed Sep. 20, 2004, now abandoned the contents of which are hereby incorporated by reference in its entirety.

FIELD OF THE INVENTION

This invention relates to crystalline microporous molecular sieve compositions. Specifically, the invention relates to layered compositions identified as UZM-13, UZM-17 and UZM-19 and to a microporous zeolite identified as UZM-25.

BACKGROUND OF THE INVENTION

It has been recently shown that a number of zeolitic systems arise from the condensation of layered precursors upon calcination. Such is the case for some Ferrierite systems (See L. Schreyeck et. al., *J Chem. Soc., Chem. Commun.*, (1995), 2187) and the MWW materials such as MCM-22 (See S. L. Lawton et. al., *J. Phys. Chem.*, (1996) 100, 3788-3798.) The present invention discloses the synthesis of three new layered compositions, UZM-13, UZM-17, and UZM-19, which upon calcination transform to the new microporous zeolite UZM-25. UZM-13 can be prepared using for example diethyldimethylammonium (DEDMA) template, UZM-17 can be prepared using for example ethyltrimethylammonium (ETMA) as the template, while UZM-19 can be prepared using for example the diquaternaryammonium cation tetramethylene (bis-1,4-trimethlyammonium) (Diquat-4) as the template.

SUMMARY OF THE INVENTION

As stated, the present invention relates to crystalline layered and microporous compositions. Accordingly, one embodiment of the invention is a crystalline layered composition in the as synthesized form on an anhydrous basis in terms of mole ratios of the elements of:

$$M_m^{n+}R_r^{p+}H_wAl_xE_ySiO_z$$

where M is at least one exchangeable cation selected from the group consisting of alkali and alkaline earth metals, "m" is the mole ratio of M to Si and varies from 0.01 to about 0.35, R is a nitrogen-containing organic cation selected from the group consisting of protonated amines, protonated diamines, protonated alkanolamines, quaternary ammonium ions, diquaternaryammonium ions, quaternized alkanolamines and mixtures thereof, "r" is the mole ratio of R to Si and has a value of about 0.05 to about 1.0, "w" is the mole ratio of hydroxyl protons to Si and varies from 0 to about 1.0, "x" is the mole ratio of Al to Si and varies from greater than 0 to about 0.25, E is at least one element selected from the group consisting of Ga, Fe, Cr, In and B, "y" is the mole ratio of E to Si and varies from 0 to about 0.25 and x+y is greater than 0.01 to about 0.25, "n" is the weighted average valence of M and has a value of about +1 to about +2, "p" is the weighted average valence of R and has a value of +1 to about +2, "z" is the mole ratio of O to Si and has a value determined by the equation:

$$z=(m·n+r·p+w+3·x+3·y+4)/2;$$

the composition characterized in that it has an x-ray diffraction pattern having at least the d-spacings and relative intensities set forth in one of Tables A, B or C.

Another embodiment of the invention is a crystalline zeolite having a three dimensional framework structure of at least $SiO_2$ and $AlO_2$ tetrahedral units and having an empirical composition in the calcined form and on an anhydrous basis expressed by an empirical formula of:

$$M1_m^{n+}Al_xE_ySiO_z$$

where M1 is at least one exchangeable cation selected from the group consisting of hydrogen ion, alkali metals, alkaline earth metals, and mixtures thereof, "m" is the mole ratio of M1 to Si and varies from about 0.01 to about 0.35, "n" is the weighted average valence of M1 and varies between 1 and 2, "x" is the mole ratio of Al to Si and varies from greater than 0 to about 0.25, E is an element which is tetrahedrally coordinated, is present in the framework and is selected from the group consisting of gallium, iron, chromium, indium, boron and mixtures thereof, "y" is the mole ratio of E to Si and varies from 0 to about 0.25 and where x+y is greater than 0.01 to about 0.25, "z" is the mole ratio of O to Si and is given by the equation:

$$z=(m·n+3·x+3·y+4)/2;$$

the zeolite characterized in that it has an x-ray diffraction pattern having at least the d-spacings and relative intensities set forth in Table D,

TABLE D

| UZM-25 | | |
|---|---|---|
| 2-Θ | d(Å) | I/I$_0$ |
| 9.40-9.79 | 9.40-9.03 | vs |
| 12.55-13.05 | 7.05-6.78 | m-s |
| 14.18-14.58 | 6.24-6.07 | w |
| 15.80-16.25 | 5.60-5.45 | w |
| 19.65-20.01 | 4.51-4.43 | w-m |
| 20.19-20.55 | 4.39-4.32 | w-m |
| 21.30-21.78 | 4.17-4.08 | w |
| 22.53-23.01 | 3.94-3.86 | w-m |
| 22.96-23.45 | 3.87-3.79 | w-m |
| 23.88-24.25 | 3.72-3.67 | w |
| 25.70-26.15 | 3.46-3.40 | m-s |
| 26.53-27.03 | 3.36-3.30 | w-m |
| 27.21-27.68 | 3.27-3.22 | w-m |

Yet another embodiment of the invention is a process for preparing the UZM-13, 17 and described above comprising forming a reaction mixture containing reactive sources of R, Al, Si, M and optionally E and reacting the reaction mixture at reaction conditions which include a temperature of about 100° C. to about 200° C. for a period of about 2 days to about 3 weeks, the reaction mixture having a composition expressed in terms of mole ratios of the oxides of:

$$aM_{2/n}O:bR_{2/p}O:cAl_2O_3:dE_2O_3:SiO_2:eH_2O$$

where "a" has a value of about 0.01 to about 0.35, "b" has a value of about 0.05 to about 0.75, "c" has a value of greater than 0 to about 0.175, "d" has a value from 0 to about 0.175 where "c"+"d" is greater than 0.005, and "e" has a value of about 8 to about 150.

A further embodiment comprises taking any of the UZM-13, 17 and 19 and calcining them at a temperature of about 400° C. to about 600° C. for a time of about 1 hr to about 24 hrs to give the UZM-25 composition.

A further embodiment of the invention is the use of the UZM-25 microporous zeolite in a hydrocarbon conversion process wherein a hydrocarbon stream is contacted with the UZM-25 described above at hydrocarbon conversion conditions to give a converted product.

These and other objects and embodiments of the invention will become more apparent after the detailed description of the invention.

DETAILED DESCRIPTION OF THE INVENTION

UZM-13, UZM-17 and UZM-19 have compositions in the as-synthesized form and on an anhydrous basis expressed by the empirical formula:

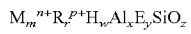

Where M is at least one exchangeable cation and is selected from the group consisting of alkali metals, alkaline earth metals, and mixtures thereof and "m" is the mole ratio of M to Si and varies from about 0.01 to about 0.35. Specific examples of the M cations include but are not limited to sodium, potassium, lithium, cesium, calcium, strontium, barium, and mixtures thereof. R is an organic cation and is selected from the group consisting of protonated amines, protonated diamines, quaternary ammonium ions, diquaternary ammonium ions, protonated alkanolamines and quaternized alkanolammonium ions. The value of "r" which is the mole ratio of R to Si varies from about 0.05 to about 1.0. The value of "n" which is the weighted average valence of M varies between about 1 and about 2. The value of "p" which is the weighted average valence of R varies from about 1 to about 2. The value of "w" which is the mole ratio of hydroxyl protons to Si varies from 0 to 1.0. The value of "x" which is the mole ratio of Al to Si is greater than 0 to about 0.25. E is an element which is tetrahedrally coordinated, is present in the framework and is selected from the group consisting of gallium, iron, chromium, indium, boron and mixtures thereof. The value of "y," which is the mole ratio of E to Si varies from 0 to about 0.25, where x+y is greater than 0.01 to about 0.25, while "z" is the mole ratio of O to Si and is given by the equation:

$$z=(m \cdot n+r \cdot p+w+3 \cdot x+3 \cdot y+4)/2$$

Where M is only one metal, then the weighted average valence is the valence of that one metal, i.e. +1 or +2. However, when more than one M metal is present, the total amount of:

$$M_m^{n+}=M_{m1}^{(n1)+}+M_{m2}^{(n2)+}+M_{m3}^{(n3)+}+\ldots$$

and the weighted average valence "n" is given by the equation:

$$n = \frac{m_1 \cdot n_1 + m_2 \cdot n_2 + m_3 \cdot n_3 + \ldots}{m_1 + m_2 + m_3 \ldots}$$

When only one R organic cation is present, the weighted average valence is the valence of the single R cation, i.e., +1 or +2. When more than one R cation is present, the total amount of R is given by the equation:

$$R_r^{p+}=R_{r1}^{(p1)+}+R_{r2}^{(p2)+}+R_{r3}^{(p3)+}$$

and the weighted average valence "p" is given by the equation:

$$p = \frac{p_1 \cdot r_1 + p_2 \cdot r_2 + p_3 \cdot r_3 + \ldots}{r_1 + r_2 + r_3 + \ldots}$$

These layered compositions are prepared by a hydrothermal crystallization of a reaction mixture prepared by combining reactive sources of R, M, aluminum, silicon and optionally E in aqueous media. Accordingly, the aluminum sources include, but are not limited to, aluminum alkoxides, precipitated alumina, aluminum hydroxide, aluminum salts and aluminum metal. Specific examples of aluminum alkoxides include, but are not limited to aluminum orthosec-butoxide, and aluminum orthoisopropoxide. Sources of silica include but are not limited to tetraethylorthosilicate, fumed silicas, precipitated silicas and colloidal silica. Sources of the M metals include but are not limited to the halide salts, nitrate salts, acetate salts, and hydroxides of the respective alkali or alkaline earth metals. Sources of the E elements include but are not limited to alkali borates, boric acid, precipitated gallium oxyhydroxide, gallium sulfate, ferric sulfate, ferric chloride, chromium chloride, chromium nitrate, indium chloride and indium nitrate. When R is a quaternary ammonium cation, the sources include without limitation the hydroxide, and halide compounds. Specific examples include without limitation ethyltrimethlyammonium hydroxide, diethyldimethlyammonium hydroxide and tetramethylene (bis-1,4-trimethylammonium)dihydroxide, trimethylene (bis-1,3 trimethylammonium)dihydroxide, dimethylene (bis-1,2 trimethylammonium) dihydroxide, trimethylpropylammonium hydroxide, trimethylbutylammonium hydroxide and trimethylpentylammonium hydroxide. Sources of R may also be neutral amines, diamines, and alkanolamines, which are partially protonated in the reaction mixture. Specific examples are triethanolamine, triethylamine, and N,N,N',N' tretramethyl-1,6-hexanediamine.

The reaction mixture containing reactive sources of the desired components can be described in terms of molar ratios of the oxides by the formula:

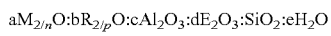

where "a" is the mole ratio of the oxide of M to Si and has a value of 0.01 to about 0.35, "b" is the mole ratio of the oxide of R to Si and has a value of about 0.05 to about 0.75, "c" is the mole ratio of the aluminum oxide to Si and has a value from greater than 0 to about 0.175, "d" is the mole ratio of the oxide of E to Si and varies from 0 to about 0.175 where c+d is greater than 0.005 but less than or equal to 0.175, and "e" is the mole ratio of water to Si and has a value of about 8 to about 150.

A preferred method for preparing the compositions of this invention involves starting with a homogenous aluminosilicate solution that contains sources of Si, Al, and the hydroxide form of the template (or one of the templates if more than one template is used). This results in a unique speciation in the final reaction mixture that can be augmented by adding crystallization inducing sources of M before the reaction mixture is reacted. Another embodiment of this preferred method involves forming the reaction mixture using two of these homogenous aluminosilicate solutions of different Si/Al ratio and then mixing them together to attain a target Si/Al ratio. These solutions will contain reactive sources of aluminum, silicon, R and optionally E. If alkoxides are used as the aluminum and silicon source, then this first solution is heated to a temperature of about 25° C. to about 100° C. for a time sufficient to distill at least a portion of the alcohol formed as a byproduct of the hydrolysis reaction. Alternatively, alcohol may be removed via vacuum or extended homogenization in an open vessel.

After distillation or alcohol removal, the first solution can optionally be aged at a temperature of about 25 to about 100° C. for a time of about 0 hr to about 96 hr. When the first solution is prepared with aluminum and silicon sources other than alkoxides, i.e. silica sol, fumed silica, precipitated silica, alumina, the initial mixture is preferably heated to a temperature of about 50 to about 100° C. for a time of about 8 hr to about 240 hr to ensure the formation of a homogenous solution.

To attain the final reaction mixture for crystallization, to these homogenous aluminosilicate solutions there is admixed a solution comprising additional R source, if required, and an M source. The R can be the same as the R in the aluminosilicate solution or it can be different.

Whether the multiple solutions are used or all the reactive source are mixed together to form a reaction mixture, the reaction mixture is now reacted at reaction conditions including a temperature of about 100° C. to about 200° C. and preferably from about 135° C. to about 175° C. for a period of about 12 hours to about 21 days and preferably for a time of about 5 days to about 16 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C.

The crystalline compositions obtained from the above process are characterized by a layered structure and a unique x-ray diffraction pattern. The compositions prepared by the above process have been given the designation UZM-13, UZM-17 and UZM-19. These particular species are characterized in that they have at least the d-spacings and relative intensities set forth in Tables A, B and C respectively.

TABLE A

UZM-13

| 2-Θ | d(Å) | I/I$_0$ |
|---|---|---|
| 7.77-8.11 | 11.37-10.89 | vs |
| 12.45-12.75 | 7.10-6.94 | w-m |
| 13.92-14.24 | 6.36-6.21 | w-m |
| 16.97-17.31 | 5.22-5.12 | w-m |
| 17.65-18.01 | 5.02-4.92 | w-m |
| 20.18-20.54 | 4.40-4.32 | m |
| 20.98-21.34 | 4.23-4.16 | w-m |
| 22.30-22.70 | 3.98-3.91 | w |
| 22.62-23.02 | 3.93-3.86 | w |
| 23.85-24.25 | 3.73-3.67 | w |
| 24.14-24.54 | 3.68-3.62 | w-m |
| 24.72-25.12 | 3.60-3.54 | m |
| 25.13-25.63 | 3.54-3.47 | m-s |
| 25.91-26.41 | 3.44-3.37 | w |
| 26.41-26.91 | 3.37-3.31 | m |
| 26.71-27.21 | 3.33-3.27 | m |
| 27.39-27.89 | 3.25-3.20 | w-m |

TABLE B

UZM-17

| 2-Θ | d(Å) | I/I$_0$ |
|---|---|---|
| 8.05-8.39 | 10.97-10.53 | vs |
| 12.42-12.76 | 7.12-6.93 | w |
| 13.33-13.67 | 6.64-6.47 | m |
| 14.78-15.12 | 5.99-5.85 | w |
| 15.45-15.85 | 5.73-5.59 | w |
| 17.63-17.97 | 5.03-4.93 | w |
| 19.90-20.25 | 4.46-4.38 | w-m |
| 20.67-21.07 | 4.29-4.21 | m-s |
| 22.35-22.75 | 3.97-3.91 | m |
| 24.12-24.52 | 3.69-3.63 | w-m |
| 25.12-25.52 | 3.54-3.49 | m-vs |
| 26.60-26.10 | 3.35-3.41 | m |
| 28.65-29.15 | 3.11-3.06 | w |

TABLE C

UZM-19

| 2-Θ | d(Å) | I/I$_0$ |
|---|---|---|
| 8.15-8.49 | 10.84-10.41 | vs |
| 12.42-12.78 | 7.12-6.92 | w |
| 13.42-13.78 | 6.59-6.42 | w-m |
| 14.80-15.16 | 5.98-5.84 | w |
| 15.46-15.83 | 5.73-5.59 | w |
| 17.70-18.05 | 5.01-4.91 | w-m |
| 18.39-18.75 | 4.82-4.73 | w |
| 20.00-20.36 | 4.44-4.36 | w-m |
| 20.78-21.18 | 4.27-4.19 | m |
| 22.34-22.74 | 3.98-3.91 | m |
| 22.78-23.18 | 3.90-3.83 | m |
| 24.13-24.63 | 3.69-3.61 | w-m |
| 24.87-25.37 | 3.58-3.51 | m |
| 25.13-25.63 | 3.54-3.47 | m-s |
| 25.93-25.43 | 3.43-3.50 | w |
| 26.57-27.07 | 3.35-3.29 | w-m |
| 27.11-27.61 | 3.29-3.23 | m |
| 27.38-27.88 | 3.25-3.20 | m |
| 27.87-28.37 | 3.20-3.14 | w |
| 28.65-29.15 | 3.11-3.06 | w |

As-synthesized, the layered compositions will contain some of the exchangeable or charge balancing cations between the layers. These exchangeable cations can be exchanged for other cations, or in the case of organic cations, they can be removed by heating under controlled conditions. Ion exchange involves contacting the compositions with a solution containing the desired cation (at molar excess) at exchange conditions. Exchange conditions include a temperature of about 15° C. to about 100° C. and a time of about 20 minutes to about 50 hours. The cations that can be exchanged include without limitation alkali or alkaline earth metals, rare earth metals such as lanthanum or mixtures thereof. Calcination conditions include a temperature of about 300° C. to about 600° C. for a time of about 2 to about 24 hours. It has been found that when any of UZM-13, UZM-17 or UZM-19 are calcined a microporous zeolite having a three dimensional framework of at least A1O$_2$, and SiO$_2$ tetrahedral units is formed. This zeolite is characterized by an empirical formula in the calcined form and on an anhydrous basis of:

$$M1_m^{n+}Al_xE_ySO_z$$

where E, "m", "n", "x" and "y" are as defined above, M1 is an exchangeable cation selected from the group consisting of hydrogen ion, alkali metals, alkaline earth metals and mixtures thereof and $z=(m \cdot n+3 \cdot x+3 \cdot y+4)/2$. This calcined zeolite has been given the designation UZM-25 and is characterized by an x-ray diffraction pattern having at least the d-spacings and intensities set forth in Table D below.

TABLE D

UZM-25

| 2-Θ | d(Å) | I/I$_0$ |
|---|---|---|
| 9.40-9.79 | 9.40-9.03 | vs |
| 12.55-13.05 | 7.05-6.78 | m-s |
| 14.18-14.58 | 6.24-6.07 | w |
| 15.80-16.25 | 5.60-5.45 | w |
| 19.65-20.01 | 4.51-4.43 | w-m |
| 20.19-20.55 | 4.39-4.32 | w-m |
| 21.30-21.78 | 4.17-4.08 | w |
| 22.53-23.01 | 3.94-3.86 | w-m |
| 22.96-23.45 | 3.87-3.79 | w-m |

TABLE D-continued

UZM-25

| 2-Θ | d(Å) | I/I₀ |
|---|---|---|
| 23.88-24.25 | 3.72-3.67 | w |
| 25.70-26.15 | 3.46-3.40 | m-s |
| 26.53-27.03 | 3.36-3.30 | w-m |
| 27.21-27.68 | 3.27-3.22 | w-m |

The microporous UZM-25 compositions of this invention will contain some of the exchangeable or charge balancing cations within its pores. These exchangeable cations can be exchanged for other cations. Ion exchange involves contacting the compositions with a solution containing the desired cation (at molar excess) at exchange conditions. Exchange conditions include a temperature of about 15° C. to about 100° C. and a time of about 20 minutes to about 50 hours. The cations that can be exchanged include without limitation $H^+$, $NH_4^+$, alkali or alkaline earth metals, rare earth metals such as lanthanum or mixtures thereof.

The UZM-25 zeolite of this invention is capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide are provided in D. W. Breck, *Zeolite Molecular Sieves*, John Wiley and Sons (1974) p. 636.

The UZM-25 of the present invention can be used as a catalyst or a catalyst support in hydrocarbon conversion processes. Hydrocarbon conversion processes are well known in the art and include cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are alkylation of aromatics and isomerization of xylenes.

The X-ray patterns presented in the following examples (and tables above) were obtained using standard X-ray powder diffraction techniques. The radiation source was a high-intensity X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70°(2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_0$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In the X-ray patterns reported, the relative intensities of the d-spacings are indicated by the notations vs, s, m and w which represent very strong, strong, medium, and weak, respectively. In terms of $100 \times I/I_0$, the above designations are defined as w=0-15; m=15-60; s=60-80 and vs=80-100. In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

UZM-13

An aluminosilicate solution was prepared by dissolving 6.44 g Al-tri-sec-butoxide in 151.18 g of 20% aqueous Diethyldimethylammonium hydroxide (DEDMAOH). While mixing, 80.62 g of deionized water was added, followed by 161.76 g of tetraethylorthosilicate (TEOS, 98%) and the resulting mixture was homogenized for an additional 1.5 hr. The reaction mixture was transferred to a round bottom flask and excess ethanol was removed by distillation. Subsequent chemical analysis of the solution indicated a composition of 8.66% Si and 0.27% Al.

Into a beaker there were placed 25.77 g of the above aluminosilicate solution followed by the addition of 14.30 g DEDMAOH (20%) and the resulting solution was homogenized. In a separate beaker, 1.21 g NaCl was dissolved in 3.73 g de-ionized $H_2O$ and the solution was then added to the previous mixture while stirring. The resulting reaction mixture was mixed for an additional 20 min. and then transferred to two 45 ml teflon lined autoclaves. The autoclaves were heated at 150° C. in an oven and removed after 168 and 264 hours. Solid products were collected by centrifugation, washed with de-ionized water and dried at 95° C. Characterization by powder x-ray diffraction showed that both products had the characteristic lines of a material which was designated UZM-13. The diffraction lines of the 168 hr product are listed in Table 1. Elemental analysis revealed the UZM-13 to contain the elemental mole ratios Si/Al=48.9, Na/Al=1.51, N/Al=6.42, and C/N=6.08. The high Na/Al and N/Al ratios are indicative of a layered material.

TABLE 1

| 2-Θ | d(Å) | I/I₀ |
|---|---|---|
| 7.94 | 11.13 | vs |
| 12.60 | 7.02 | w |
| 14.08 | 6.28 | m |
| 17.14 | 5.17 | m |
| 17.83 | 4.97 | w |
| 20.36 | 4.36 | m |
| 21.16 | 4.20 | m |
| 22.50 | 3.95 | w |
| 22.82 | 3.89 | w |
| 24.06 | 3.70 | w |
| 24.34 | 3.65 | w |
| 24.92 | 3.57 | m |

TABLE 1-continued

| 2-Θ | d(Å) | I/I$_0$ |
|---|---|---|
| 25.38 | 3.51 | m |
| 26.16 | 3.40 | w |
| 26.66 | 3.34 | m |
| 26.96 | 3.30 | m |
| 27.64 | 3.22 | m |

EXAMPLE 2

UZM-13

An aluminosilicate solution was prepared by dissolving 3.26 g Al-tri-sec-butoxide in 145.46 g diethyldimethylammonium hydroxide (20%) (DEDMAOH). While mixing, 87.44 g of deionized H$_2$O was added followed by 163.84 g of tetraethylorthosilicate (TEOS, 98%), after which the reaction mixture was homogenized for 1.5 hr. The solution was then transferred to a round bottom flask and excess ethanol was removed by distillation. Elemental analyses indicated the solution contained 8.12% Si and 0.13% Al.

Into a breaker there were placed 26.48 g of the above aluminosilicate solution followed by the addition of 13.54 g DEDMAOH (20%) and the resulting solution was mixed well. In a separate beaker, 1.19 g NaCl was dissolved in 3.79 g de-ionized H$_2$O and the NaCl solution was then added to the aluminosilicate solution and the resulting reaction mixture was mixed for an additional 20 min. A portion of the reaction mixture was then transferred to a 45 ml Teflon-lined autoclave and the reaction mixture was digested at 150° C. under autogenous pressure. After 168 hours, the autoclave was removed from the oven and a solid product was collected by centrifugation, washed with de-ionized water and dried at 95° C. Characterization by powder x-ray diffraction showed the product had the characteristic lines of the material designated UZM-13. Table 2 lists characteristic diffraction lines for this product. Elemental analysis of the isolated solid yielded the elemental molar ratios Si/Al=87.23, Na/Al=0.93, N/Al=9.49, C/N=6.06. The high N/Al ratio is indicative of a layered material.

TABLE 2

| 2-Θ | d(Å) | I/I$_0$ |
|---|---|---|
| 7.94 | 11.13 | vs |
| 12.56 | 7.02 | w |
| 14.08 | 6.29 | w |
| 17.18 | 5.16 | w |
| 17.88 | 4.96 | w |
| 20.42 | 4.35 | m |
| 21.16 | 4.19 | m |
| 22.48 | 3.95 | w |
| 22.84 | 3.89 | w |
| 24.04 | 3.70 | w |
| 24.38 | 3.65 | w |
| 24.90 | 3.57 | m |
| 25.38 | 3.51 | m |
| 26.16 | 3.40 | w |
| 26.68 | 3.34 | m |
| 26.92 | 3.31 | m |
| 27.68 | 3.22 | w |

EXAMPLE 3

UZM-13

An aluminosilicate solution was prepared by dissolving 11.40 g Al(O-secBu)$_3$ (97%) in 508.19 g DEDMAOH (20%), which was followed by the addition of 387.83 g colloidal silica (Ludox AS-40, 40% SiO$_2$), all carried out with vigorous mixing. After mixing for 20 min, the mixture was placed in a Teflon bottle and the mixture digested for 10 days at 95° C., at which point it was a clear solution. Elemental analysis revealed the solution to contain 7.53% Si and 0.15% Al.

DEDMAOH (20%), 294.93 g, was added to a 816.62 g portion of the aluminosilicate solution above with vigorous stirring. Separately, a sodium chloride solution was prepared by dissolving 39.13 g NaCl in 129.32 g de-ionized water. With vigorous mixing, the sodium chloride solution was added to the aluminosilicate solution, and stirred for an additional hour after completion of the addition. The reaction mixture was placed in a 2 L Parr static reactor and digested for 8 days at 150° C. under autogenous pressure. The product was isolated by centrifugation, washed with de-ionized water, and dried at 95° C. Powder x-ray diffraction showed the product to be UZM-13. Diffraction lines characteristic of the sample are given in Table 3. Elemental analysis of the solid gave the elemental mole ratios Si/Al=19.26, Na/Al=1.52, N/Al=3.43, and C/N=5.97.

TABLE 3

| 2-Θ | d(Å) | I % |
|---|---|---|
| 7.96 | 11.10 | vs |
| 12.63 | 7.00 | w |
| 14.10 | 6.28 | w |
| 17.20 | 5.15 | w |
| 17.87 | 4.96 | w |
| 20.42 | 4.35 | m |
| 21.24 | 4.18 | w |
| 22.54 | 3.94 | w |
| 22.78 | 3.90 | w |
| 24.04 | 3.70 | w |
| 24.41 | 3.64 | w |
| 24.88 | 3.58 | m |
| 25.42 | 3.50 | m |
| 26.20 | 3.40 | w |
| 26.66 | 3.34 | m |
| 27.00 | 3.30 | m |
| 27.74 | 3.21 | w |

EXAMPLE 4

UZM-17

An aluminosilicate solution was prepared as in examples 1-3 except with the ETMA template, using ETMAOH (12.8%). A solution with the following stoichiometry was prepared: Si/Al=23.7, ETMAOH/Si=0.542, H$_2$O/Si=23.7. To a 809 μportion of the aluminosilicate solution, 291 μl of ETMAOH (12.8%) was added with mixing. This was followed by the addition of 100 μl NaCl solution (24.47% aq.) and vigorous mixing for another 30 minutes. The reaction vessel was sealed and the contents digested at 150° C. for 336 hr under autogenous pressure. The solid products were isolated by centrifugation, washed with de-ionized water and dried at 75° C. Powder x-ray diffraction revealed a product which was identified as UZM-17. Characteristic diffraction lines for UZM-17 are given in Table 4.

TABLE 4

| 2-Θ | d(Å) | I % |
|---|---|---|
| 8.25 | 10.71 | vs |
| 12.55 | 7.05 | w |
| 13.51 | 6.55 | m |
| 14.96 | 5.92 | w |
| 15.56 | 5.69 | w |
| 17.82 | 4.97 | w |
| 18.69 | 4.74 | w |
| 20.10 | 4.41 | w |
| 20.90 | 4.25 | m |
| 22.55 | 3.94 | m |
| 24.30 | 3.66 | w |
| 25.35 | 3.51 | s |
| 26.85 | 3.32 | m |
| 27.30 | 3.26 | m |
| 28.10 | 3.17 | w |
| 28.95 | 3.08 | w |

EXAMPLE 5

UZM-17

An aluminosilicate solution was prepared as in example 4 with the following stoichiometry: Si/Al=48.42, ETMAOH/Si=0.521, H$_2$O/Si=23.31. To a 809 µl portion of the aluminosilicate solution, 292 µl of ETMAOH (12.8%) was added with mixing. This was followed by the addition of 99 µl NaCl solution (24.47% aq.) and vigorous mixing for another 30 minutes. The reaction vessel was sealed and the contents digested at 150° C. for 168 hr under autogenous pressure. The solid products were isolated by centrifugation, washed with de-ionized water and dried at 75° C. Powder x-ray diffraction revealed the product to be UZM-17. Characteristic diffraction lines for this sample of UZM-17 are given in Table 5.

TABLE 5

| 2-Θ | d(Å) | I/I$_0$ |
|---|---|---|
| 8.20 | 10.78 | vs |
| 12.64 | 7.00 | w |
| 13.50 | 6.55 | m |
| 14.94 | 5.92 | w |
| 15.75 | 5.62 | w |
| 17.79 | 4.98 | w |
| 18.46 | 4.80 | w |
| 20.05 | 4.42 | m |
| 20.84 | 4.26 | m |
| 22.55 | 3.94 | m |
| 24.35 | 3.65 | m |
| 25.30 | 3.52 | vs |
| 26.91 | 3.31 | m |
| 27.80 | 3.21 | m |
| 28.91 | 3.09 | w |

EXAMPLE 6

A reaction mixture was prepared by adding 62.25 g Diquat-4 dihydroxide (16.5%) to 29.57 g colloidal silica (Ludox AS-40, 40% SiO$_2$) with vigorous stirring. Next, 9.41 g NaCl solution (24.47% aq.) was added to the reaction mixture, followed by additional homogenization. A portion of the reaction mixture was placed in a Teflon-lined autoclave and digested for 168 hr at 165° C. under autogenous pressure. The product was isolated by filtration, washed with de-ionized water and dried at 95° C. Powder x-ray diffraction analysis showed a product which was identified as UZM-19. Characteristic diffraction lines for the UZM-19 product are shown in Table 6. Elemental analysis indicated the product to consist of the following elemental ratios: Si/Al=127.1, Na/Al=0.67, N/Al=14.1, C/N=4.6. The aluminum in the material is an impurity from the Ludox AS-40 silica source.

TABLE 6

| 2-Θ | d(Å) | I/I$_0$ |
|---|---|---|
| 8.32 | 10.62 | vs |
| 12.60 | 7.02 | w |
| 13.60 | 6.51 | w |
| 14.98 | 5.91 | w |
| 15.65 | 5.66 | w |
| 17.88 | 4.96 | m |
| 18.58 | 4.77 | w |
| 20.18 | 4.40 | w |
| 20.98 | 4.23 | m |
| 22.14 | 4.01 | w |
| 22.54 | 3.94 | m |
| 22.98 | 3.87 | m |
| 24.38 | 3.65 | w |
| 25.12 | 3.54 | m |
| 25.38 | 3.51 | s |
| 25.98 | 3.43 | w |
| 26.82 | 3.32 | m |
| 27.36 | 3.26 | m |
| 27.64 | 3.22 | m |
| 28.12 | 3.17 | w |
| 28.90 | 3.09 | w |

EXAMPLE 7

UZM-25

Each of the layered aluminosilicates UZM-13 (example 1) and UZM-19 (example 6) were calcined to form a microporous crystalline zeolite which was identified as UZM-25. UZM-13 was calcined at 550° C. in air for 12 hr while UZM-19 was calcined in air at 520° C. for 4 hr to obtain UZM-25. Characteristic diffraction lines from the powder x-ray diffraction patterns of the resulting UZM-25 materials are shown in Table 7.

TABLE 7

| UZM-25 via calcined UZM-13 | | | UZM-25 via calcined UZM-19 | | |
|---|---|---|---|---|---|
| 2-Θ | d(Å) | I/I$_0$ | 2-Θ | d(Å) | I/I$_0$ |
| 9.62 | 9.19 | vs | 9.58 | 9.23 | vs |
| 12.90 | 6.86 | vs | 12.72 | 6.95 | m |
| 14.44 | 6.13 | w | 14.34 | 6.17 | w |
| 16.10 | 5.50 | w | 15.96 | 5.55 | w |
| 18.26 | 4.85 | w | | | |
| 18.76 | 4.73 | w | 18.82 | 4.71 | w |
| 19.28 | 4.60 | w | 19.33 | 4.59 | w |
| 19.86 | 4.47 | m | 19.80 | 4.48 | w |
| 20.34 | 4.36 | m | 20.40 | 4.35 | w |
| 21.64 | 4.10 | w | 21.46 | 4.14 | w |
| 22.86 | 3.89 | m | 22.69 | 3.92 | w |
| 23.30 | 3.81 | m | 23.12 | 3.84 | w |
| 24.10 | 3.69 | w | 24.04 | 3.70 | w |
| | | | 25.60 | 3.48 | m |
| 25.96 | 3.43 | s | 25.88 | 3.44 | m |
| 26.78 | 3.33 | m | 26.78 | 3.33 | w |
| 27.48 | 3.24 | m | 27.42 | 3.25 | m |
| 29.12 | 3.06 | w | | | |
| 30.06 | 2.97 | w | | | |

The invention claimed is:

1. A crystalline layered composition having an empirical composition in the as-synthesized form and on an anhydrous basis expressed by an empirical formula of:

$$M_m^{n+}R_r^{p+}H_wAl_xE_ySiO_z$$

where M is at least one exchangeable cation selected from the group consisting of alkali metals, alkaline earth metals, and mixtures thereof, "m" is the mole ratio of M to Si and varies from about 0.01 to about 0.35, R is an organic cation selected from the group consisting of protonated amines, protonated diamines, quaternary ammonium ions, diquaternary ammonium ions, protonated alkanolamines and quaternized alkanolammonium ions, "r" is the mole ratio of R to Si and varies from about 0.05 to about 1.0, "n" is the weighted average valence of M and varies between about 1 and about 2, "p" is the weighted average valence of R varies from 1 to about 2, H is a hydroxyl proton and "w" is the mole ratio of H to Si and varies from 0 to about 1.0, "x" is the mole ratio of Al to Si and varies from greater than 0 to about 0.25, E is an element which is tetrahedrally coordinated, is present in the framework and is selected from the group consisting of gallium, iron, chromium, indium, boron and mixtures thereof, and "y" is the mole ratio of E to Si and varies from 0 to about 0.25, and x+y is greater than 0.01 to about 0.25, "z" is the mole ratio of O to Si and is given by the equation:

$$z=(m \cdot n + r \cdot p + w + 3 \cdot x + 3 \cdot y + 4)/2;$$

the layered composition characterized in that it has an x-ray diffraction pattern having at least the d-spacings and relative intensities set forth in one of Tables A, B or C

TABLE A

| UZM-13 | | |
|---|---|---|
| 2-Θ | d(Å) | I/I₀ |
| 7.77-8.11 | 11.37-10.89 | vs |
| 12.45-12.75 | 7.10-6.94 | w-m |
| 13.92-14.24 | 6.36-6.21 | w-m |
| 16.97-17.31 | 5.22-5.12 | w-m |
| 17.65-18.01 | 5.02-4.92 | w-m |
| 20.18-20.54 | 4.40-4.32 | m |
| 20.98-21.34 | 4.23-4.16 | w-m |
| 22.30-22.70 | 3.98-3.91 | w |
| 22.62-23.02 | 3.93-3.86 | w |
| 23.85-24.25 | 3.73-3.67 | w |
| 24.14-24.54 | 3.68-3.62 | w-m |
| 24.72-25.12 | 3.60-3.54 | m |
| 25.13-25.63 | 3.54-3.47 | m-s |
| 25.91-26.41 | 3.44-3.37 | w |
| 26.41-26.91 | 3.37-3.31 | m |
| 26.71-27.21 | 3.33-3.27 | m |
| 27.39-27.89 | 3.25-3.20 | w-m |

TABLE B

| UZM-17 | | |
|---|---|---|
| 2-Θ | d(Å) | I/I₀ |
| 8.05-8.39 | 10.97-10.53 | vs |
| 12.42-12.76 | 7.12-6.93 | w |
| 13.33-13.67 | 6.64-6.47 | m |
| 14.78-15.12 | 5.99-5.85 | w |
| 15.45-15.85 | 5.73-5.59 | w |
| 17.63-17.97 | 5.03-4.93 | w |
| 19.90-20.25 | 4.46-4.38 | w-m |
| 20.67-21.07 | 4.29-4.21 | m-s |
| 22.35-22.75 | 3.97-3.91 | m |
| 24.12-24.52 | 3.69-3.63 | w-m |

TABLE B-continued

| UZM-17 | | |
|---|---|---|
| 2-Θ | d(Å) | I/I₀ |
| 25.12-25.52 | 3.54-3.49 | m-vs |
| 26.60-26.10 | 3.35-3.41 | m |
| 28.65-29.15 | 3.11-3.06 | w |

TABLE C

| UZM-19 | | |
|---|---|---|
| 2-Θ | d(Å) | I/I₀ |
| 8.15-8.49 | 10.84-10.41 | vs |
| 12.42-12.78 | 7.12-6.92 | w |
| 13.42-13.78 | 6.59-6.42 | w-m |
| 14.80-15.16 | 5.98-5.84 | w |
| 15.46-15.83 | 5.73-5.59 | w |
| 17.70-18.05 | 5.01-4.91 | w-m |
| 18.39-18.75 | 4.82-4.73 | w |
| 20.00-20.36 | 4.44-4.36 | w-m |
| 20.78-21.18 | 4.27-4.19 | m |
| 22.34-22.74 | 3.98-3.91 | m |
| 22.78-23.18 | 3.90-3.83 | m |
| 24.13-24.63 | 3.69-3.61 | w-m |
| 24.87-25.37 | 3.58-3.51 | m |
| 25.13-25.63 | 3.54-3.47 | m-s |
| 25.93-25.43 | 3.43-3.50 | w |
| 26.57-27.07 | 3.35-3.29 | w-m |
| 27.11-27.61 | 3.29-3.23 | m |
| 27.38-27.88 | 3.25-3.20 | m |
| 27.87-28.37 | 3.20-3.14 | w |
| 28.65-29.15 | 3.11-3.06 | w. |

2. The composition of claim 1 where M is at least one metal selected from the group consisting of lithium, cesium, sodium, potassium, strontium, barium, calcium, magnesium and mixtures thereof.

3. The composition of claim 1 where the organic cation is a quaternary ammonium cation selected from the group consisting of ethyltrimethylammonium, diethyldimethylammonium, tetramethylene (bis-1,4-trimethlyammonium), trimethylene(bis-1,3 trimethylammonium), and dimethylene(bis-1,2 trimethylammonium), trimethylpropylammonium, trimethylbutylammonium, trimethylpentylammonium, and mixtures thereof.

4. A crystalline zeolite having a three dimensional framework structure of at least $SiO_2$ and $AlO_2$ tetrahedral units and having an empirical composition in the calcined form and on an anhydrous basis expressed by an empirical formula of:

$$M1_m^{n+}Al_xE_ySiO_z$$

where M1 is at least one exchangeable cation selected from the group consisting of protons, alkali metals, alkaline earth metals, and mixtures thereof, "m" is the mole ratio of M1 to Si and varies from about 0.01 to about 0.35, "n" is the weighted average valence of M1 and varies between 1 and 2, "x" is the mole ratio of Al to Si and varies from greater than 0 to about 0.25, E is an element which is tetrahedrally coordinated, is present in the framework and is selected from the group consisting of gallium, iron, chromium, indium, boron and mixtures thereof, "y" is the mole ratio of E to Si and varies from 0 to about 0.25 and where x+y is greater than 0.01 to about 0.25, "z" is the mole ratio of O to Si and is given by the equation:

$$z=(m \cdot n + 3 \cdot x + 3 \cdot y + 4)/2;$$

the zeolite characterized in that it has an x-ray diffraction pattern having at least the d-spacings and relative intensities set forth in Table D

TABLE D

| | UZM-25 | |
|---|---|---|
| 2-Θ | d(Å) | I/I₀ |
| 9.40-9.79 | 9.40-9.03 | vs |
| 12.55-13.05 | 7.05-6.78 | m-s |
| 14.18-14.58 | 6.24-6.07 | w |
| 15.80-16.25 | 5.60-5.45 | w |
| 19.65-20.01 | 4.51-4.43 | w-m |
| 20.19-20.55 | 4.39-4.32 | w-m |
| 21.30-21.78 | 4.17-4.08 | w |
| 22.53-23.01 | 3.94-3.86 | w-m |
| 22.96-23.45 | 3.87-3.79 | w-m |
| 23.88-24.25 | 3.72-3.67 | w |
| 25.70-26.15 | 3.46-3.40 | m-s |
| 26.53-27.03 | 3.36-3.30 | w-m |
| 27.21-27.68 | 3.27-3.22 | w-m. |

5. The zeolite of claim 4 where M is at least one metal selected from the group consisting of lithium, cesium, sodium, potassium, strontium, barium, calcium, magnesium and mixtures thereof.

6. A process for preparing a crystalline layered composition having an empirical composition in the as-synthesized form and on an anhydrous basis expressed by an empirical formula of:

$$M_m^{n+}R_r^{p+}H_wAl_xE_ySiO_z$$

where M is at least one exchangeable cation selected from the group consisting of alkali metals, alkaline earth metals, and mixtures thereof, "m" is the mole ratio of M to Si and varies from about 0.01 to about 0.35, R is an organic cation selected from the group consisting of protonated amines, protonated diamines, quaternary ammonium ions, diquaternary ammonium ions, protonated alkanolamines and quaternized alkanolammonium ions, "r" is the mole ratio of R to Si and varies from about 0.05 to about 1.0, "n" is the weighted average valence of M and varies between about 1 and about 2, "p" is the weighted average valence of R varies from 1 to about 2, "x" is the mole ratio of Al to Si and varies from greater than 0 to about 0.25, E is an element which is tetrahedrally coordinated, is present in the framework and is selected from the group consisting of gallium, iron, chromium, indium, boron and mixtures thereof, and "y" is the mole ratio of E to Si and varies from 0 to about 0.25, and x+y is greater than 0.01 to about 0.25, "z" is the mole ratio of O to Si and is given by the equation:

$$z=(m \cdot n + r \cdot p + w + 3 \cdot x + 3 \cdot y + 4)/2;$$

the composition characterized in that it has an x-ray diffraction pattern having at least the d-spacings and relative intensities set forth in one of Tables A, B or C

TABLE A

| | UZM-13 | |
|---|---|---|
| 2-Θ | d(Å) | I/I₀ |
| 7.77-8.11 | 11.37-10.89 | vs |
| 12.45-12.75 | 7.10-6.94 | w-m |
| 13.92-14.24 | 6.36-6.21 | w-m |
| 16.97-17.31 | 5.22-5.12 | w-m |
| 17.65-18.01 | 5.02-4.92 | w-m |

TABLE A-continued

| | UZM-13 | |
|---|---|---|
| 2-Θ | d(Å) | I/I₀ |
| 20.18-20.54 | 4.40-4.32 | m |
| 20.98-21.34 | 4.23-4.16 | w-m |
| 22.30-22.70 | 3.98-3.91 | w |
| 22.62-23.02 | 3.93-3.86 | w |
| 23.85-24.25 | 3.73-3.67 | w |
| 24.14-24.54 | 3.68-3.62 | w-m |
| 24.72-25.12 | 3.60-3.54 | m |
| 25.13-25.63 | 3.54-3.47 | m-s |
| 25.91-26.41 | 3.44-3.37 | w |
| 26.41-26.91 | 3.37-3.31 | m |
| 26.71-27.21 | 3.33-3.27 | m |
| 27.39-27.89 | 3.25-3.20 | w-m |

TABLE B

| | UZM-17 | |
|---|---|---|
| 2-Θ | d(Å) | I/I₀ |
| 8.05-8.39 | 10.97-10.53 | vs |
| 12.42-12.76 | 7.12-6.93 | w |
| 13.33-13.67 | 6.64-6.47 | m |
| 14.78-15.12 | 5.99-5.85 | w |
| 15.45-15.85 | 5.73-5.59 | w |
| 17.63-17.97 | 5.03-4.93 | w |
| 19.90-20.25 | 4.46-4.38 | w-m |
| 20.67-21.07 | 4.29-4.21 | m-s |
| 22.35-22.75 | 3.97-3.91 | m |
| 24.12-24.52 | 3.69-3.63 | w-m |
| 25.12-25.52 | 3.54-3.49 | m-vs |
| 26.60-26.10 | 3.35-3.41 | m |
| 28.65-29.15 | 3.11-3.06 | w |

TABLE C

| | UZM-19 | |
|---|---|---|
| 2-Θ | d(Å) | I/I₀ |
| 8.15-8.49 | 10.84-10.41 | vs |
| 12.42-12.78 | 7.12-6.92 | w |
| 13.42-13.78 | 6.59-6.42 | w-m |
| 14.80-15.16 | 5.98-5.84 | w |
| 15.46-15.83 | 5.73-5.59 | w |
| 17.70-18.05 | 5.01-4.91 | w-m |
| 18.39-18.75 | 4.82-4.73 | w |
| 20.00-20.36 | 4.44-4.36 | w-m |
| 20.78-21.18 | 4.27-4.19 | m |
| 22.34-22.74 | 3.98-3.91 | m |
| 22.78-23.18 | 3.90-3.83 | m |
| 24.13-24.63 | 3.69-3.61 | w-m |
| 24.87-25.37 | 3.58-3.51 | m |
| 25.13-25.63 | 3.54-3.47 | m-s |
| 25.93-25.43 | 3.43-3.50 | w |
| 26.57-27.07 | 3.35-3.29 | w-m |
| 27.11-27.61 | 3.29-3.23 | m |
| 27.38-27.88 | 3.25-3.20 | m |
| 27.87-28.37 | 3.20-3.14 | w |
| 28.65-29.15 | 3.11-3.06 | w | the process comprising forming a reaction mixture containing reactive sources of R, Al, Si, M and optionally E and reacting the reaction mixture at reaction conditions which include a temperature of about 100° C. to about 200° C. for a period of about 2 days to about 3 weeks, the reaction mixture having a composition expressed in terms of mole ratios of the oxides of:

$$aM_{2/n}O:bR_{2/p}O:cAl_2O_3:dE_2O_3:SiO_2:eH_2O$$

where "a" has a value of about 0.01 to about 0.35, "b" has a value of about 0.05 to about 0.75, "c" has a value of greater than 0 to about 0.175, "d" has a value from 0 to about 0.175 where "c"+"d" has a value greater than 0.005, and "e" has a value of about 8 to about 150.

7. The process of claim 6 where M is selected from the group consisting of lithium, cesium, sodium, potassium, strontium, barium, calcium, magnesium and mixtures thereof.

8. The process of claim 6 where R is a quaternary ammonium cation selected from the group consisting of ethyltrimethylammonium, diethyldimethylammonium, tetramethylene (bis-1,4-trimethlyammonium), trimethylene(bis-1,3 trimethylammonium), and dimethylene(bis-1,2 trimethylammonium), trimethylpropylammonium, trimethylbutylammonium, trimethylpentylammonium and mixtures thereof.

9. The process of claim 8 where the quaternary ammonium source is selected from the group consisting of hydroxide compounds, halide compounds, and mixtures thereof.

10. The process of claim 6 where the source of M is selected from the group consisting of halide salts, nitrate salts, acetate salts, hydroxides, sulfate salts and mixtures thereof.

11. The process of claim 6 where the source of E is selected from the group consisting of alkali borates, boric acid, precipitated gallium oxyhydroxide, gallium sulfate, ferric sulfate, ferric chloride, chromium chloride, chromium nitrate, indium chloride and indium nitrate.

12. The process of claim 6 where the aluminum source is selected from the group consisting of aluminum isopropoxide, aluminum sec-butoxide, precipitated alumina, $Al(OH)_3$, aluminum metal and aluminum salts.

13. The process of claim 6 where the silicon source is selected from the group consisting of tetraethyorthosilicate, fumed silica, colloidal silica and precipitated silica.

14. The process of claim 6 where the reaction mixture is formed by preparing a first solution comprising reactive sources of R, aluminum, silicon and optionally E and admixing to this solution a second solution comprising reactive sources of R and M to form the reaction mixture.

15. The process of claim 14 where the R in the first solution and the R in the second solution are the same cation.

16. The process of claim 6 where the resulting layered composition is calcined at a temperature of about 400° C. to about 600° C. for a time of about 1 hr to about 24 hr to provide a crystalline zeolite having a three dimensional framework structure of at least $SiO_2$ and $AlO_2$ tetrahedral units and having an empirical composition in the calcined form and on an anhydrous basis expressed by an empirical formula of:

$$M1_m^{n+}Al_xE_ySiO_z$$

where M1 is at least one exchangeable cation selected from the group consisting of hydrogen ion, alkali metals, alkaline earth metals, and mixtures thereof, "m" is the mole ratio of M1 to Si and varies from about 0.01 to about 0.35, "n" is the weighted average valence of M1 and varies between 1 and 2, "x" is the mole ratio of about Al to Si and varies from greater than 0 to about 0.25, E is an element which is tetrahedrally coordinated, is present in the framework and is selected from the group consisting of gallium, iron, chromium, indium, boron and mixtures thereof, "y" is the mole ratio of E to Si and varies from 0 to about 0.25 and where x+y varies from greater than 0.01 to about 0.25, "z" is the mole ratio of O to Si and is given by the equation:

$$z=(m \cdot n+3 \cdot x+3 \cdot y+4)/2;$$

the zeolite characterized in that it has an x-ray diffraction pattern having at least the d-spacings and relative intensities set forth in Table D

TABLE D

| UZM-25 | | |
|---|---|---|
| 2-Θ | d(Å) | I/I₀ |
| 9.40-9.79 | 9.40-9.03 | vs |
| 12.55-13.05 | 7.05-6.78 | m-s |
| 14.18-14.58 | 6.24-6.07 | w |
| 15.80-16.25 | 5.60-5.45 | w |
| 19.65-20.01 | 4.51-4.43 | w-m |
| 20.19-20.55 | 4.39-4.32 | w-m |
| 21.30-21.78 | 4.17-4.08 | w |
| 22.53-23.01 | 3.94-3.86 | w-m |
| 22.96-23.45 | 3.87-3.79 | w-m |
| 23.88-24.25 | 3.72-3.67 | w |
| 25.70-26.15 | 3.46-3.40 | m-s |
| 26.53-27.03 | 3.36-3.30 | w-m |
| 27.21-27.68 | 3.27-3.22 | w-m. |

17. A hydrocarbon conversion process comprising contacting a hydrocarbon stream with a microporous crystalline zeolite at hydrocarbon conversion conditions to give a converted product, the microporous crystalline zeolite having a composition in the calcined form on an anhydrous basis expressed by an empirical formula of:

$$M1_m^{n+}Al_xE_ySiO_z$$

where M is at least one exchangeable cation selected from the group consisting of hydrogen ion, alkali metals, alkaline earth metals, and mixtures thereof, "m" is the mole ratio of M to Si and varies from about 0.01 to about 0.35, "n" is the weighted average valence of M varies between 1 and 2, "x" is the mole ratio of about Al to Si and varies from greater than 0 to about 0.25, E is an element which is tetrahedrally coordinated, is present in the framework and is selected from the group consisting of gallium, iron, chromium, indium, boron and mixtures thereof, "y" is the mole ratio of E to Si and varies from 0 to about 0.25 and where x+y is greater than 0.01 to about 0.25, "z" is the mole ratio of O to Si and is given by the equation:

$$z=(m \cdot n+3 \cdot x+3 \cdot y+4)/2;$$

the zeolite characterized in that it has an x-ray diffraction pattern having at least the d-spacings and relative intensities set forth in Table D

TABLE D

| UZM-25 | | |
|---|---|---|
| 2-Θ | d(Å) | I/I₀ |
| 9.40-9.79 | 9.40-9.03 | vs |
| 12.55-13.05 | 7.05-6.78 | m-s |
| 14.18-14.58 | 6.24-6.07 | w |
| 15.80-16.25 | 5.60-5.45 | w |
| 19.65-20.01 | 4.51-4.43 | w-m |
| 20.19-20.55 | 4.39-4.32 | w-m |
| 21.30-21.78 | 4.17-4.08 | w |
| 22.53-23.01 | 3.94-3.86 | w-m |
| 22.96-23.45 | 3.87-3.79 | w-m |
| 23.88-24.25 | 3.72-3.67 | w |
| 25.70-26.15 | 3.46-3.40 | m-s |
| 26.53-27.03 | 3.36-3.30 | w-m |
| 27.21-27.68 | 3.27-3.22 | w-m. |

* * * * *